(12) United States Patent
Kawamoto

(10) Patent No.: US 6,584,320 B1  
(45) Date of Patent: Jun. 24, 2003

(54) SERVER BASED PROVISION OF MAP DATA TO TERMINAL DEVICES

(75) Inventor: Yoji Kawamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/666,896

(22) Filed: Sep. 20, 2000

Related U.S. Application Data

(63) Continuation of application No. 08/772,405, filed on Dec. 23, 1996, now Pat. No. 6,167,277.

(30) Foreign Application Priority Data

Dec. 28, 1995 (JP) ............................................. 7-342579

(51) Int. Cl.[7] ................................................. H04Q 7/22
(52) U.S. Cl. ........................ 455/457; 455/414; 455/525
(58) Field of Search ................................. 455/456, 457, 455/524, 525, 517, 404, 414, 461, 436; 340/961, 995, 989; 342/357, 457, 357.01, 357.08, 357.1; 701/207, 208, 209, 210, 211, 212, 213

(56) References Cited

U.S. PATENT DOCUMENTS

| | | | |
|---|---|---|---|
| 3,925,750 A | 12/1975 | Gilbert et al. | |
| 5,046,130 A | 9/1991 | Hall et al. | |
| 5,121,126 A | 6/1992 | Clagett | |
| 5,257,399 A | 10/1993 | Kallin et al. | |
| 5,519,760 A | * 5/1996 | Borkowski et al. | 455/404 |
| 5,524,136 A | 6/1996 | Bar-Noy et al. | |
| 5,613,202 A | 3/1997 | Ishida et al. | |
| 5,635,940 A | 6/1997 | Hickman et al. | |
| 5,689,809 A | 11/1997 | Grube et al. | |
| 5,842,131 A | * 11/1998 | Yamane | 455/456 |
| 6,121,924 A | * 9/2000 | Meek | 340/995 |
| 6,131,067 A | * 10/2000 | Girerd et al. | 340/989 |
| 6,199,045 B1 | * 3/2001 | Giniger et al. | 340/991 |

* cited by examiner

*Primary Examiner*—Lester G. Kincaid  
(74) *Attorney, Agent, or Firm*—Frommer Lawrence & Haug LLP; William S. Frommer; Bruno Polito

(57) ABSTRACT

In a terminal equipment, when a signal demanding for the detection of the present position of a mating second portable remote terminal is outputted from a first portable remote terminal, nearest a first base station transmits the signal to a server. The server, upon receiving the demand signal, receives the present position of the mating second portable remote terminal by way of a second base station, reads out a map data including the present positions for the first portable remote terminal and the second portable remote terminal from data base and transmits the same to the first and second portable remote terminals.

24 Claims, 14 Drawing Sheets

20 PORTABLE REMOTE TERMINAL

25 SERVER

| BASE STATION ID | POSITION | |
| --- | --- | --- |
| | NORTH LATITUDE | EAST LONGITUDE |
| 0001 | 35° 55' 20" ~ 35° 55' 30" | 135° 15' 19" ~ 135° 15' 55" |
| 0002 | 35° 55' 25" ~ 35° 56' 10" | 135° 15' 25" ~ 135° 16' 05" |
| 0003 | 35° 55' 30" ~ 35° 55' 49" | 135° 15' 20" ~ 135° 15' 45" |
| 0004 | 35° 55' 50" ~ 35° 54' 10" | 135° 15' 55" ~ 135° 16' 12" |
| 0005 | 35° 55' 10" ~ 35° 54' 30" | 135° 15' 05" ~ 135° 16' 10" |
| ⋮ | ⋮ | ⋮ |

USER A AND USER B ARE PRESENT IN ONE IDENTICAL MAP

USER A AND USER B CANNOT BE CONTAINED IN ONE IDENTICAL MAP

USER A AND USER B CANNOT BE CONTAINED IN ONE IDENTICAL MAP

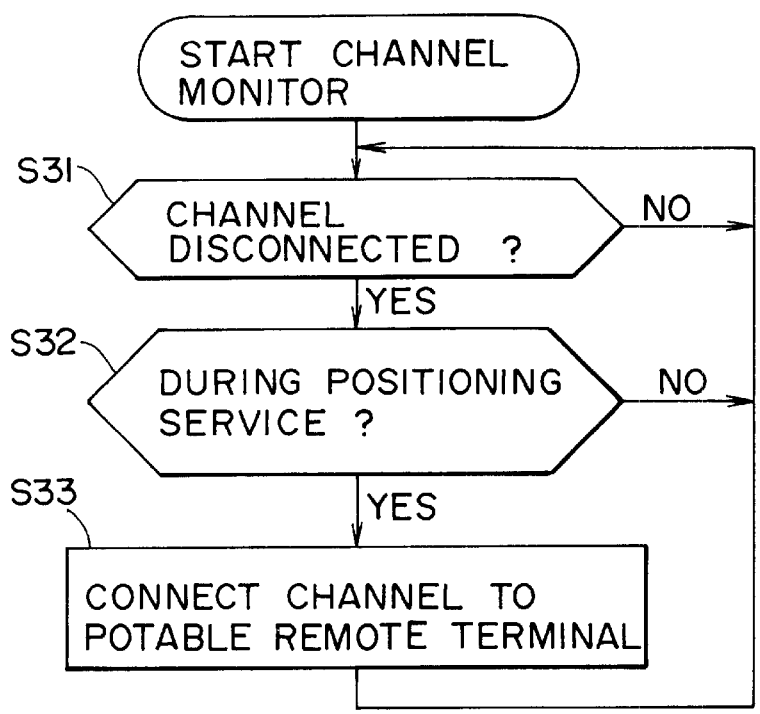
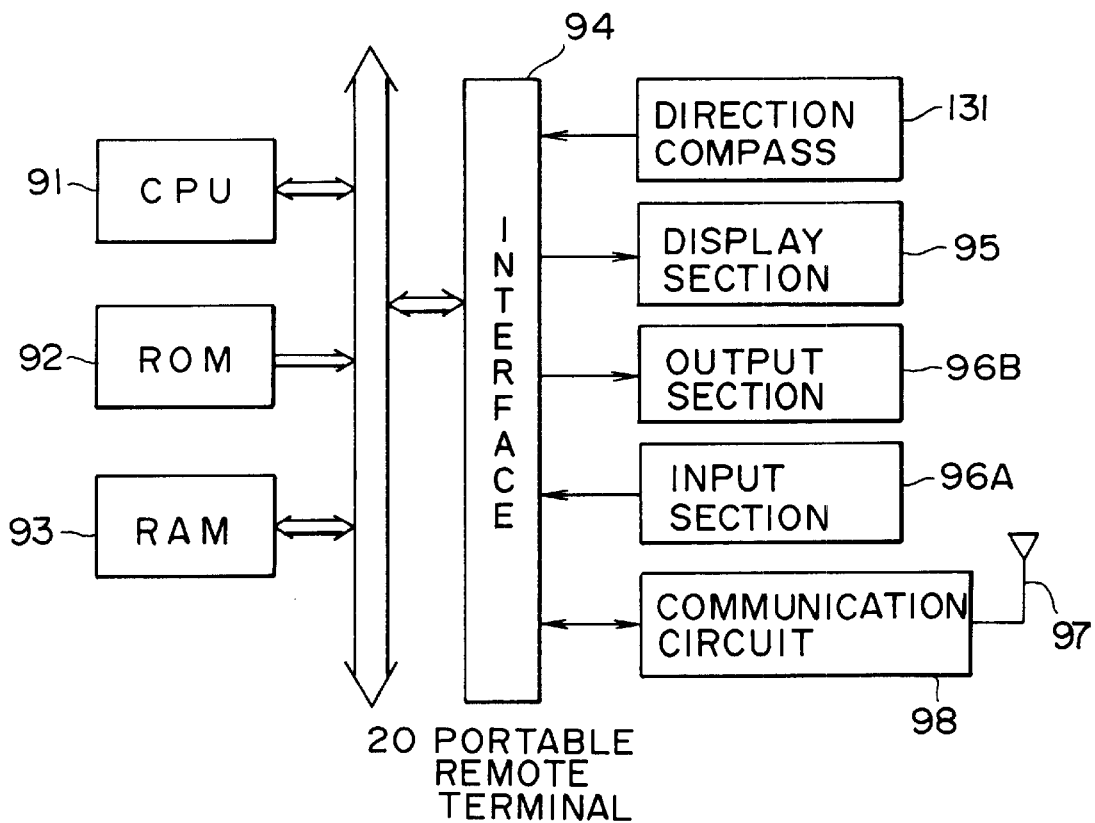

USER A AND USER B ARE PRESENT IN ONE IDENTICAL MAP

USER A AND USER B CANNOT BE CONTAINED IN ONE IDENTICAL MAP

USER A AND USER B CANNOT BE CONTAINED
IN ONE IDENTICAL MAP

SERVER BASED PROVISION OF MAP DATA TO TERMINAL DEVICES

This is a continuation of Ser. No. 08/772,405, filed Dec. 23, 1996, now U.S. Pat. No. 6,167,277.

BACKGROUND OF THE INVENTION

1. Field of the Invention

The present invention relates to a positioning system in which a plurality of terminal equipments are connected by way of a communication network, and a terminal equipment can detect the present position of other terminal equipment.

2. Description of Related Art

FIG. 20 shows an example for the constitution of a positioning system of the prior art. In the positioning system, user A has portable remote terminal 11A and GPS (Global Positioning System) device 12A connected with terminal equipment 11A. In the same manner, other user B has portable remote terminal 11B and GPS device 12B connected with portable remote terminal 11B.

Portable remote terminals 11A and 11B are enabled to conduct radio communication between each other by way of radio communication network 13. The GPS devices 12A, 12B receive radiowaves outputted from a plurality of low earth orbit satellites 10A, 10B (usually by the number of three or more although illustrated by two in this embodiment), and the present positions of each of the terminals is determined by calculation.

When user A intends to recognize the present position of user B for instance, user A calls to portable remote terminal 11B of the user B by way of radio communication network 13 (telephone). Then, user A asks user B to inform the present position by telephone (voices).

Upon receiving the request, user B reads the present position from GPS device 12B and informs the read present position to user A by telephone (voices).

The procedures are the same when user B intends to recognize the present position of user A.

In the positioning system of the prior art, since each of the users informs the present position by the voices, it is difficult to recognize an accurate position of the mating terminal.

Further, since portable remote terminal 11A or 11B for informing the present position to the mating terminal and GPS device 12A or 12B for detecting the present position are provided separately, they have to be carried about individually, which makes the device larger in the size and inconvenient to carry about.

The present invention has been accomplished in view of the foregoing situations and it is an object of the invention for simply recognizing the present position of other user and avoiding the enlargement for the size of the device.

SUMMARY OF THE INVENTION

For attaining the foregoing problems, in accordance with the present invention, there is provided a terminal equipment comprising;

detection means for detecting positional information indicating the present position of terminal equipment, transmission means for transmitting the positional information detected by the detection means to a communication channel when the transmission of the positional information for the present position is demanded from other terminal equipment; and receiving means for receiving positional information of other terminal equipment sent by way of the communication channel.

Further, in accordance with the present invention, there is provided a positional information display method comprising:

a detection step of detecting positional information indicating the present position of a terminal equipment, a sending step of sending the positional information to a communication channel when transmission of the positional information for the present position is demanded from other terminal equipment, a receiving step of receiving the positional information of other terminal equipment transmitted by way of the communication channel, and a displaying step of displaying the positional information of other terminal equipment based on the received positional information of other terminal equipment.

Further, in accordance with the present invention, there is provided a positional information providing device comprising:

demand receiving means for receiving a positional information demand instruction from a first terminal equipment connected by way of a communication channel, connection demand transmission means for transmitting a connection demand instruction to a second terminal equipment based on the positional information demand instruction from the first terminal equipment, positional information receiving means for receiving positional information indicating the present position of the second terminal equipment from the second terminal equipment, and a positional information transmission means for transmitting the data indicating the present position of the second terminal equipment connected by way of the communication channel to the first terminal equipment based on the positional information received from the second terminal equipment.

In accordance with the present invention, there is provided a positional information providing method comprising:

a demand receiving step of receiving a positional information demand instruction from a first terminal equipment connected by way of a communication channel, a connection demand transmission step of transmitting a connection demand instruction to a second terminal equipment connected by way of a communication channel based on the positional information demand instruction from the first terminal equipment, a positional information receiving step of receiving positional information indicating the present position of the second terminal equipment from the second terminal equipment, and a positional information transmission step of transmitting data indicating the present position of the second terminal equipment to the first terminal equipment based on the positional information received from the second terminal equipment.

BRIEF DESCRIPTION OF THE DRAWINGS

FIG. 10 is a flow chart for explaining a channel monitoring conducted by CPU 111 in FIG. 3;

FIG. 11 is a block diagram illustrating another example of a constitution for a portable remote terminal 20 in FIG. 1;

DETAILED DESCRIPTION OF PREFERRED EMBODIMENTS

Figure 1:
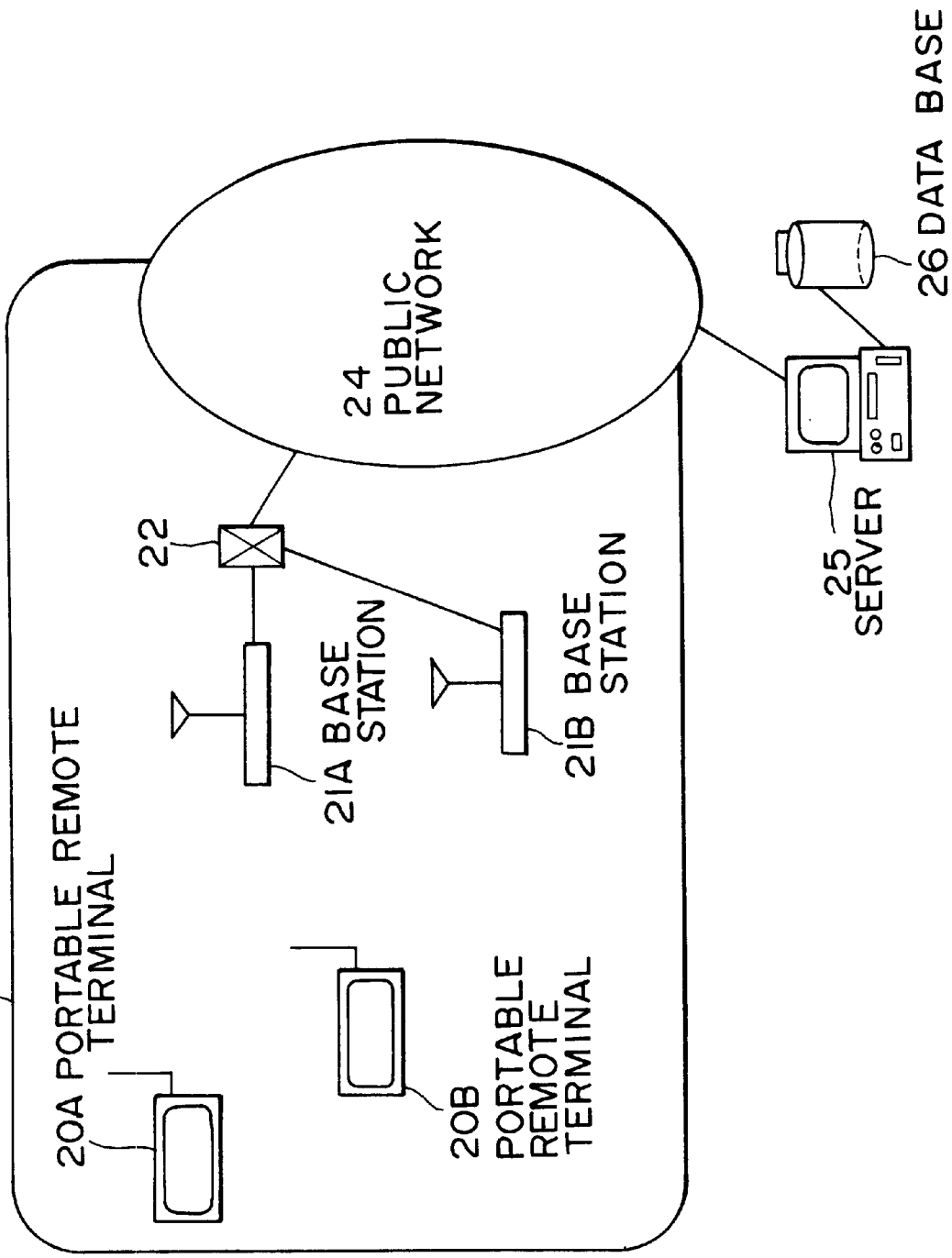
FIG. 1 is a view illustrating the constitution of a positioning system applied with a terminal equipment according to the present invention.

FIG. 1 illustrates a constitution of a positioning system according to the present invention. In this embodiment, user A has portable remote terminal 20A while user B has portable remote terminal 20B. Portable remote terminals 20A, 20B are adapted to conduct radio communication with the nearest base station among base stations 21A, 21B and the like in radio communication network 23 owned by a corporation of a portable telephone system. Base stations 21A, 21B are connected by way of a switching system 22 to a public network 24. Server 25 is connected with the public network 24, and a data base 26 is connected to the server 25. In this embodiment, description will be made to an example of a PHS (Personal Handy phone System) as the portable telephone system.

PHS is one of mobile communication systems practiced in Japan. Radiowave base stations are disposed on every several hundred meters at the outdoor, and a telephone terminal equipment periodically exchanges positional information with the nearest base station among a plurality of base stations and communicates with other telephone terminal equipments by way of the base station. Further, PHS divides and compresses voice signals with time by using a TDD (Time Division Duplex) system and conducts transmission/reception on one carrier frequency. Further, PHS conducts multiplex communication while dividing four channels with time in one carrier frequency by using a TDMA (Time Division Multiple Access) system. The frequency band used for PHS communication is a 1.9 GHz band. Further, digital data communication is possible at a transmission rate of 32 kbit/sec per 1 channel, and data can be transmitted at a maximum rate of 128 kbit/sec (32 k×4 channels) by using a plurality of channels at 1 terminal.

Figure 2:
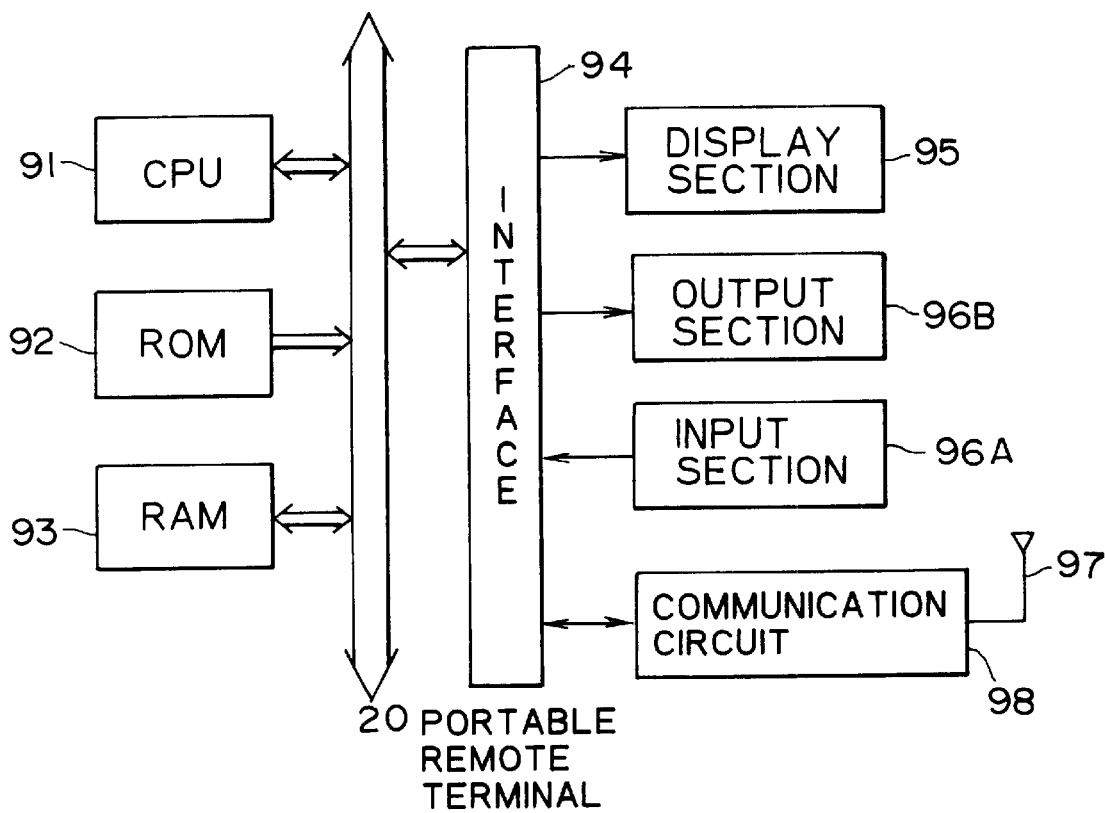
FIG. 2 is a block diagram illustrating an example for the constitution of a portable remote terminal 20 shown in FIG. 1.

Portable remote terminal 20 (hereinafter, portable remote terminal 20A, 20B, etc. are collectively referred to as portable remote terminal 20 if no particular distinction is necessary) is constituted, for example, as shown in FIG. 2. CPU 91 executes various kinds of processings in accordance with programs stored in ROM 92. RAM 93 properly stores programs or data required for practicing various kinds of processings by CPU 91. Input section 96A comprises buttons, switches and keys and a predetermined instruction can be inputted to CPU 91 by way of interface 94 by operating them. Further, input section 96A has a microphone for inputting voice signals so as to enable voice communication (telephone). Further, output section 96B has a loud speaker for outputting voice signals of a mating person of telephone.

Display section 95 comprises, for example, a liquid crystal display device and is adapted to display images such as characters and graphs supplied by way of interface 94. Communication circuit 98 forms a communication link with predetermined base station 21 among base stations 21A, 21B (base stations 21A, 21B, etc are hereinafter collectively referred as a base station 21 if no particular distinction is necessary) by way of antenna 97 to conduct radiowave communication.

Figure 3:
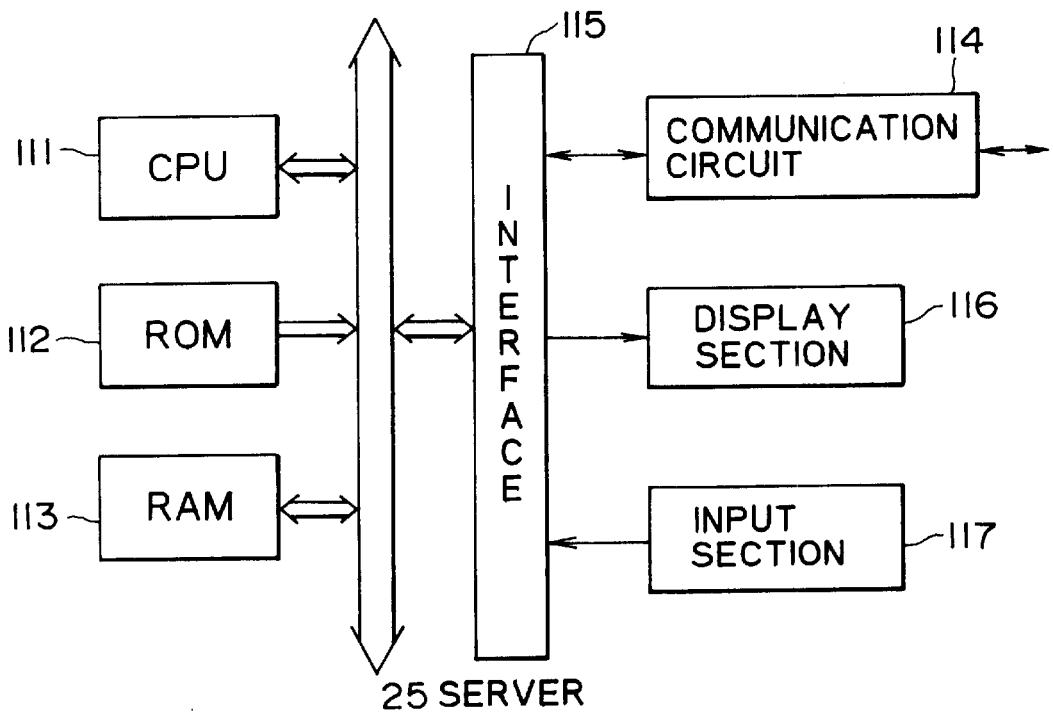
FIG. 3 is a block diagram illustrating an example for the constitution of a server 25 shown in FIG. 1.

Server 25 is constituted, for example, as shown in FIG. 3. CPU 111 executes various kinds of processings in accordance with programs stored in ROM 112. RAM 113 properly stores programs or data required for CPU 111 to execute various kinds of processings. Input section 117 comprises, for example, a key board, a mouse and a microphone and is operated upon inputting various kinds of instructions. Interface 115 conducts interfacing processing for communication circuit 114, display section 116 and input section 117. Display section 116 comprises, for example, a liquid display device and a CRT and is adapted to display images such as characters and graphs inputted by way of interface 115. Communication circuit 114 is adapted to communicate with portable remote terminal 20 by way of public network 24.

Figure 4:
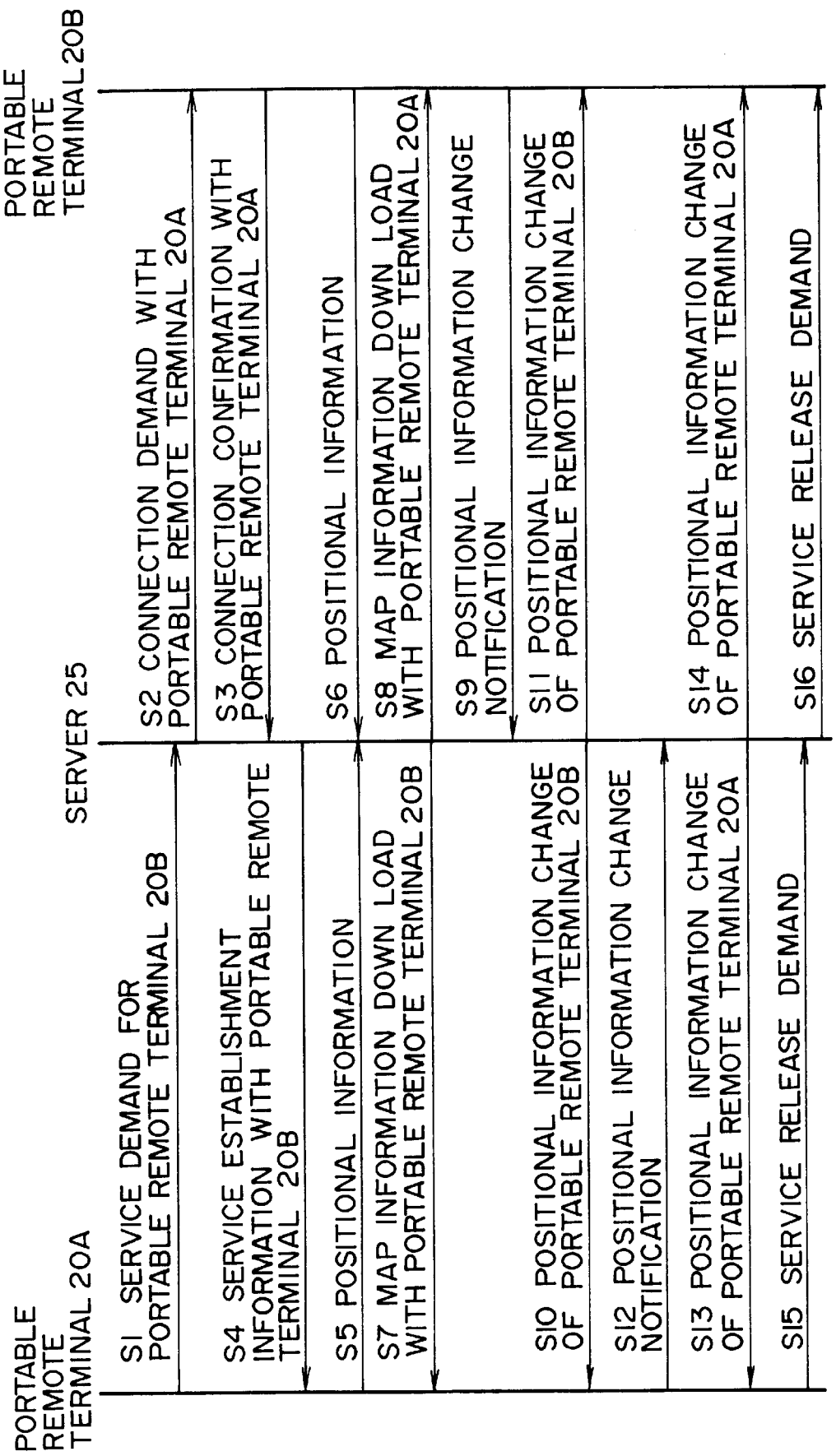
FIG. 4 is a sequence chart for explaining the operation of the preferred embodiment in FIG. 1.

Then, operation will be explained with reference to the sequence diagram in FIG. 4. At first, at step S1, user A who wants to recognize the present position of user B (portable remote terminal 20B), operates input section 96A to instruct CPU 91 to search the present position of portable remote terminal 20B. At step S1, CPU 91 controls communication circuit 98 to output a service demand of circuit connection with portable remote terminal 20B to server 25. The demand signal is transmitted from the nearest base station 21 of portable remote terminal 20A (for example, base station 21A) by way of switching system 22 and public network 24 to server 25. When receiving the demand signal by way of communication circuit 114, CPU 111 of server 25 controls communication circuit 114 at step S2 to inform the connection demand from portable remote terminal 20A to portable remote terminal 20B. The information signal is transmitted by way of public network 24 and switching system 22 from the nearest base station of portable remote terminal 20B (for example, base station 21B) to portable remote terminal 20.

When receiving the information signal input by way of communication circuit 98, CPU 91 of portable remote terminal 20B displays the reception of the information signal on display section 95. Further, CPU 91 also informs this from output section 96B by voice signals. User B can recognize the connection demand from portable remote terminal 20A based on this output. Then, for answering the connection demand, user B operates input section 96 to input for answer.

In this case, CPU 91 of portable remote terminal 20B controls, at step S3, communication circuit 98 to output a connection confirmation signal with portable remote terminal 20A to server 25. The connection confirmation signal is transmitted from base station 21B by way of public network 24 to server 25.

When the connection confirmation signal with portable remote terminal 20A is received from portable remote terminal 20B, CPU 111 of server 25 controls, at step S4, communication circuit 114 to generate service establishing information with portable remote terminal 20B to portable remote terminal 20A. This information signal is also transmitted by way of public network 24, switching system 22 and base station 21A to portable remote terminal 20A.

In portable remote terminal 20A, the signal is received by way of communication circuit 98 at which CPU 91 outputs the service establishing information to display section 95 and output section 96B. Thus, user A can recognize formation of a communication link with user B.

Subsequently, user A and user B can enter conversation by usual voices.

That is, voice signals inputted from the microphone of input section 96A of portable remote terminal 20A are outputted by way of communication circuit 98 to portable remote terminal 20B. The voice signals are received by communication circuit 98 of portable remote terminal 20B and outputted from output section 96B.

Further, voice signals of user B inputted from input section 96A of portable remote terminal 20B are transmitted by way of communication circuit 98 to portable remote terminal 20A. In portable remote terminal 20A, the voice signals are received by way of communication circuit 98 and outputted from output section 96B. In this way, user A and user B can cause portable remote terminals 20A and 20B to function as usual telephones.

In radio communication network 28, two radio channels are provided in which one channel is used for communication and the other channel is used for transfer of positional information.

Then when service is established with portable remote terminal 20B, CPU 91 of portable remote terminal 20A (as described above) outputs, at step S5, information regarding the present position of portable remote terminal 20A by way of communication circuit 98 to server 25. In the same manner, at step S6, CPU 91 of portable remote terminal 20B controls communication circuit 98 to transmit the positional information regarding the present position of portable remote terminal 20B.

Figure 5:
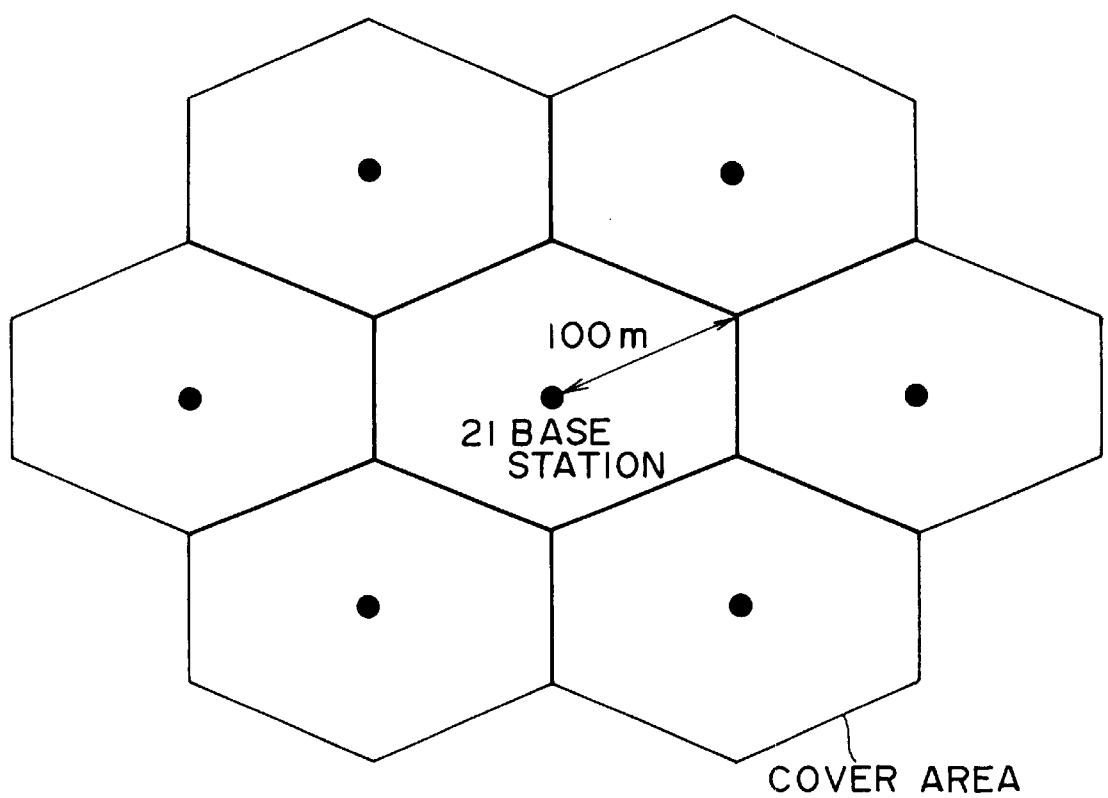
FIG. 5 is a chart for explaining a cover area of a base station.

In PHS, as shown in FIG. 5, base stations 21 are disposed on every cover area having a radius of about 100 m. Each of base stations 21 transmit/receives radiowaves to and from portable remote terminals 20 situated in the relevant cover area and conducts communication therewith. Accordingly, when a portable remote terminal 20 forms a communication link with a predetermined base station 21, it can be assumed that portable remote terminal 20 situates within the cover area of the above-mentioned base station 21.

Figures 6, 7:
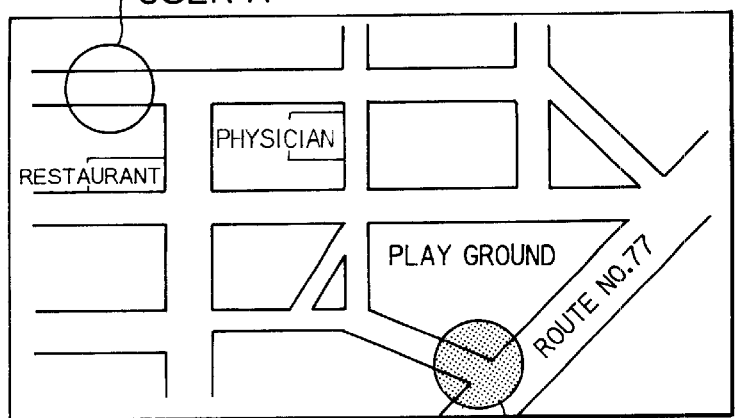
FIG. 6 is a view for explaining correspondence between the ID number and the position (cover area) of the base station in FIG. 1.
FIG. 7 is a view illustrating an example of indication displayed on a display section 95 in FIG. 2.

Then as shown in FIG. 6, if correspondence between the ID number for each of base stations (identification number for identifying the base station) and a cover area are (position) thereof is previously stored as a table in RAM 113 of server 25, server 25 can detect, when receiving the ID number of the base station from portable remote terminal 20, can detect the cover area (present position for portable remote terminal 20) based on the ID number.

For instance, in the example shown in FIG. 6, assuming the ID number for base station 21 as 0002, it can be judged that portable remote terminal 20 situates within a range of North latitude from 35° 55' 25" to 35° 56' 10" and of east longitude from 135° 15' 25" to 135° 16' 05".

Then, CPU 91 of portable remote terminal 20A or 20B, when forming a communication link with nearest base station 21A or 21B, acquires the relevant ID number and transmits, at step S5, S6, the ID number of corresponding base station 21A or 21B as the present position to server 25.

As described above, upon receiving supply of positional information for the present position from portable remote terminal 20A (ID number of base station 21A) and receiving supply of positional information for the present position from portable remote terminal 20B (ID number of base station 21B), CPU 111 of server 25 searches the cover area of base stations 21A and 21B as the present position for portable remote terminals 20A and 20B while referring to the table in RAM 113. Further, CPU 111 accesses to data base 26 and searches map data including the present position for portable remote terminals 20A, 20B. Then, CPU transmits the map data of portable remote terminal 20B and the present position of portable remote terminal 20B to portable remote terminal 20A, and transmits other map data of portable remote terminal 20A and the present position of portable remote terminal 20A to portable remote terminal 20B. That is, server 25 transmits the map data and the present positional information of each of the mating terminals.

Upon receiving the input of the map data and the present positional information of mating portable remote terminal, CPU 91 of portable remote terminal 20 once stores the data in RAM 93, reads out and displays the same on display section 95. Thus, a map in which present positions for both of user A and user B are displayed together as shown in FIG. 7 is displayed on display section 95 of portable remote terminal 20A and display section 95 of portable remote terminal 20B respectively. In this case, present position of the mating terminal (place of presence) and present position of its own (place of presence) are displayed such that they can be distinguished from each other by changing color, brightness or the like.

Figure 8:
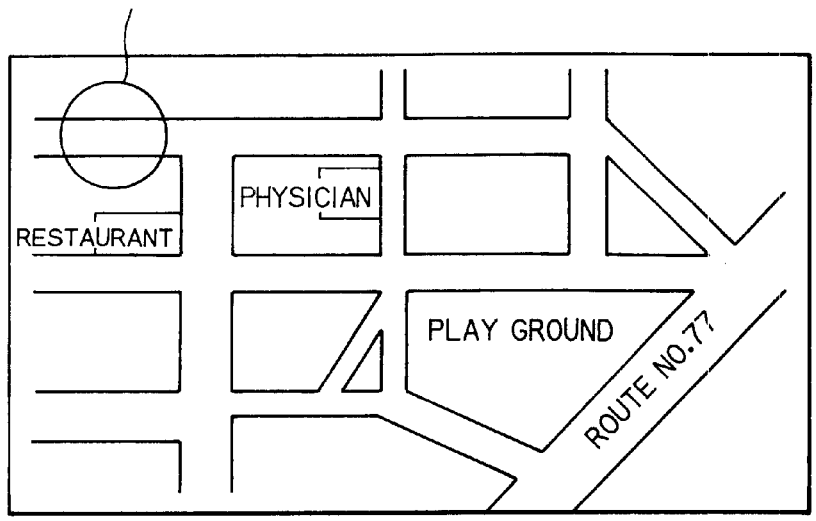
FIG. 8 is a view illustrating an example of indication displayed on a display section 95 in FIG. 2.
Figure 9:
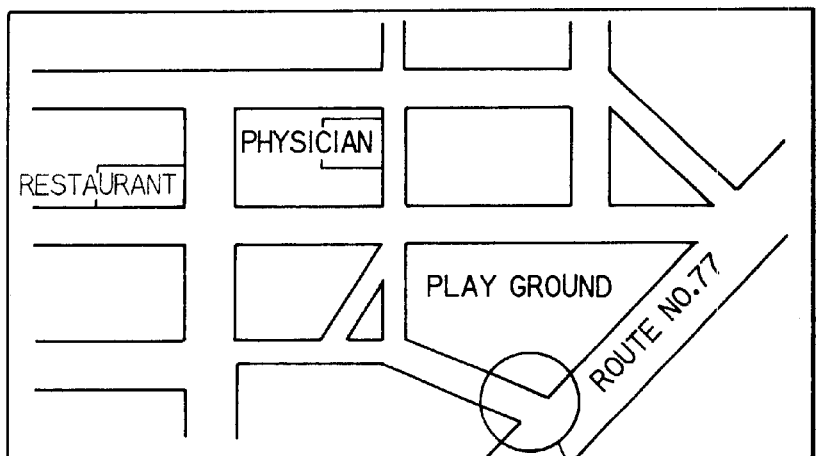
FIG. 9 is a view illustrating an example of indication displayed on a display section 95 in FIG. 2.

In a case in which the present position of user A and the present position of user B are at a great distance and a map including both of them can not be displayed on display section 95 of portable remote terminal 20, a map including the present position of the user A (portable remote terminal 20A) is displayed on display 95 of portable remote terminal 20B (FIG. 8), while a map including the present position of user B (portable remote terminal 20B) is displayed on display section 95 of portable remote terminal 20A (FIG. 9).

As the other way, if the present position of user A and the present position of user B are at a great distance and a map including both of them can not be display on display section 95 of portable remote terminal 20, server 25 can select a map on a reduced scale containing both the present position of user A (portable remote terminal 20A) and the present position of user B (portable remote terminal 20B) by CPU 111 and transmits the same to portable remote terminal 20A and portable remote terminal 20B.

When user B having portable remote terminal 20B moves from the preceding cover area of base station 21B to a cover area of other base station, a hand over processing of re-forming a communication link with respect to a new base station is conducted in PHS. When the hand over processing is conducted, CPU 91 of portable remote terminal 20B acquires, at step S9, an ID number of the new base station and transmits the same to server 25.

When the ID number of the new base station is received, server 25 informs, at steps S10, S11, change of the positional information of portable remote terminal 20B to portable remote terminals 20A and 20B (a new position of map). Upon receiving transmission of the new present position CPU 91 of portable remote terminal 20 stores the same in RAM 93, read outs the stored information and displays the same on display section 95. In this way, on every movement of portable remote terminal 20B to the cover area of new base station 21, the present position is updated.

This procedures are the same when user A having portable remote terminal 20A moves from the preceding cover area of base station 21A to the cover area of other base station, and hand over processing is conducted.

That is, when the hand over processing is conducted, CPU 91 of portable remote terminal 20A acquires, at step S12, the ID number of the new base station and transmits the same to server 25.

When the ID number of the new base station is received, CPU 111 of server 25 transmits, at steps S13, S14, the new present position on the map by way of communication circuit 114 to portable remote terminals 20A and 20B.

Upon receiving the transmission of the new present position CPU 91 of portable remote terminal 20, stores the same in RAM 93, reads out and displays the same on display section 95. Thus, also in a case where portable remote terminal 20A moves to the cover area of the new base station, the present position is updated.

When the range of the map stored in the RAM 93 and displayed on display section 95 no more contains the present position, CPU 91 of portable remote terminal 20 demands transfer of the new map data to server 25. In compliance with the demand, server 25 searches a new map (map including the present position) and transmits the same to portable remote terminal 20.

In this way, user A and user B can recognize the position of the mating terminals with reference to maps displayed on display sections 95 of respective portable remote terminals 20A, 20B.

For ending the reception of the provision of the positioning service, user A operates input section 96A to input an end instruction to CPU 91. CPU 91 of portable remote terminal 20A outputs, at step S15, a service end demand signal to server 25. Then, at step S16, CPU 111 of server 25 outputs a service release demand signal to portable remote terminal 20B.

The circuit can be disconnected also from portable remote terminal 20B.

In a case of PHS, hand over processing can not be conducted over base stations administrated by different switching system. Accordingly, the circuit is disconnected at the instance the hand over processing is conducted over different switching system. As a result, it is no more possible to continuously enjoy the positioning service. Then, CPU 111 of sever 25 executes channel monitoring as shown in FIG. 10 during provision of the positioning service.

That is, CPU 111 judges at first, at step S31, whether the channel is disconnected or not by hand over processing over different switching system. If the channel is not disconnected, it stands-by till disconnection.

When it is judged that the channel is disconnected, it goes to step S32 and judges if the positioning service is being conducted or not. If it is not during the positioning service, it returns to step S31 and executes the subsequent processings repeatedly. If it is judges, at step S32, that this is during the positioning service, it goes to step S33 and CPU 111 executes processing of connecting the channel to portable remote terminal 20.

In this way, when the channel is disconnected as a result of the hand over processing conducted over the different switching system, server 25 automatically conducts channel connection treatment to portable remote terminal 20 thereby providing the positioning service.

The channel monitoring may be conducted also by CPU 91 of portable remote terminal 20 by the same processing.

Even when the channel is disconnected temporarily, for example, by hand over processing over different switching system, if the channel connection is conducted rapidly in this way, since the map data stored in RAM 93 is displayed continuously on display section 95, the user can receive the provision of the positioning service not aware of the disconnection of the channel.

Figure 12:
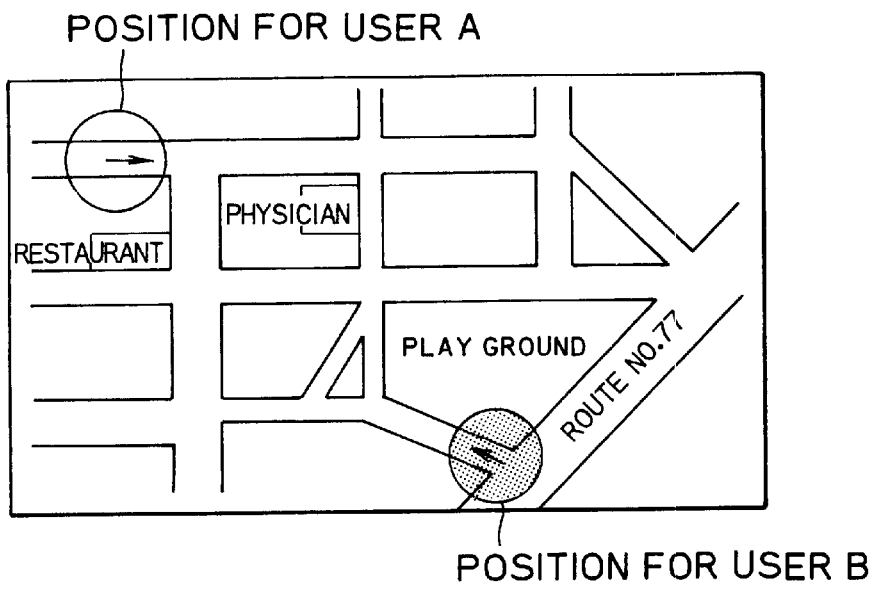
FIG. 12 is a view illustrating an example of indication on a display section 95 in FIG. 11.
Figure 13:
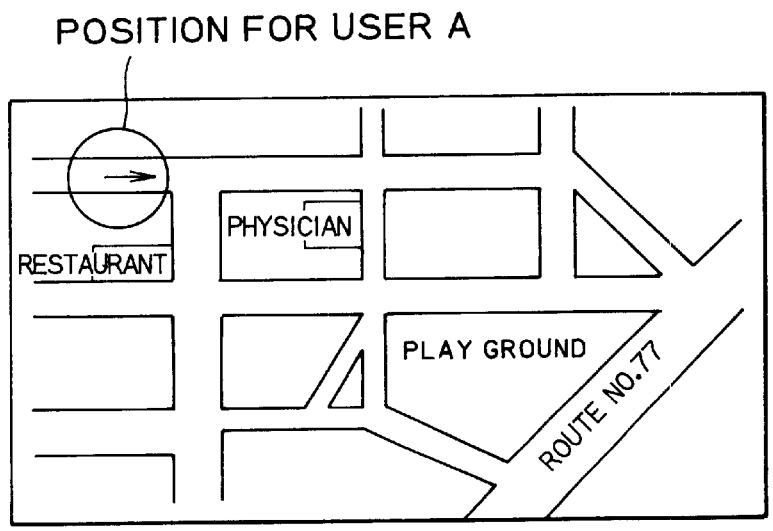
FIG. 13 is a view illustrating an example of indication on a display section 95 in FIG. 11.
Figure 14:
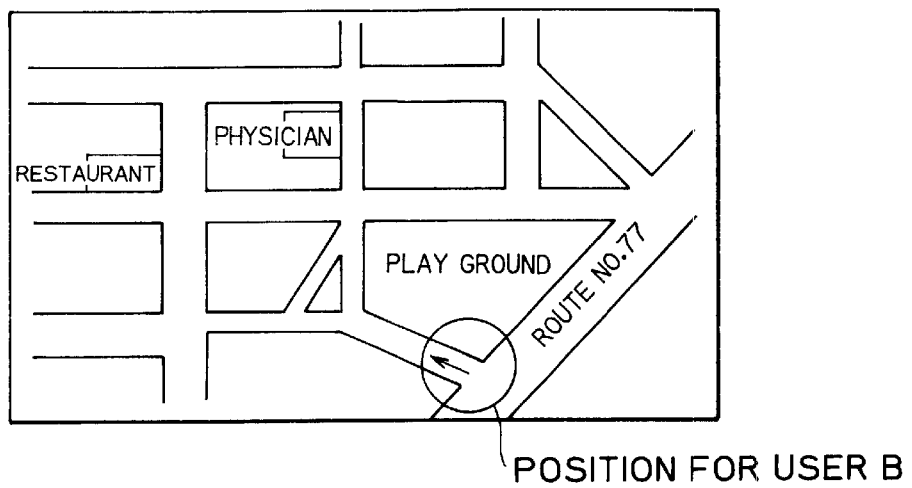
FIG. 14 is a view illustrating an example of indication on a display section 95 in FIG. 11.

In the embodiment shown in FIG. 2, the direction along which portable remote terminal 20 moves can not be detected. Then, as shown in FIG. 11, for distance, a direction compass 131 is disposed to portable remote terminal 20 to detect the direction directed by portable remote terminal 20 which can be outputted to server 25. In this case, as shown in FIG. 12 to FIG. 14 (corresponding, respectively, to FIG. 7 to FIG. 9), server 25 transmits data in which circular marks indicating present positions and arrow marks indicating the direction along which the portable remote terminal 20 moves are displayed together on the map to portable remote terminal 20 and display the same on display section 95.

With such a constitution, each of the users can recognize the current moving direction.

The marks indicating the advancing direction can also be displayed on display section 95 by generating difference data based on the present position and the preceding positional information stored in RAM 93 and calculating the moving direction based on the difference data by CPU 91 of portable remote terminal 20.

Figure 15:
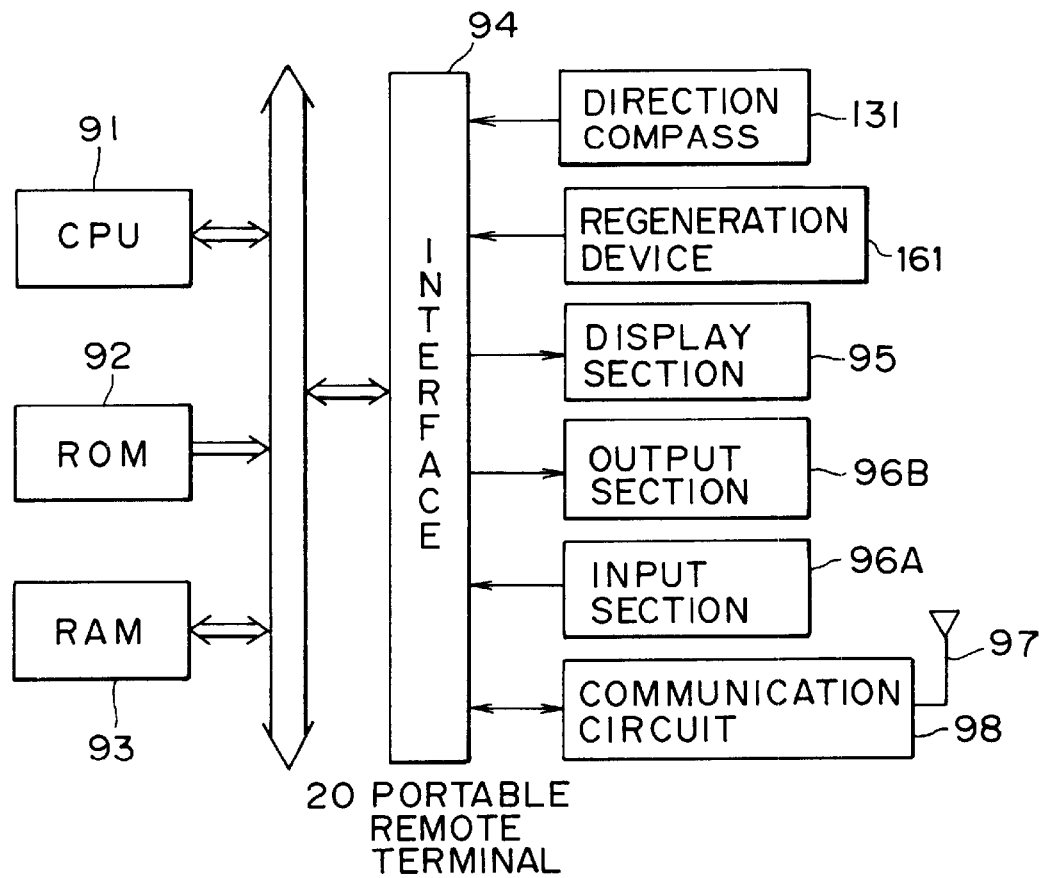
FIG. 15 is a block diagram illustrating another example of a constitution for the portable remote terminal 20 in FIG. 1.

In the foregoing explanation, portable remote terminal 20A and portable remote terminal 20B are connected by way of server 25, but portable remote terminal 20A and portable remote terminal 20B may be connected directly not by way of server 25. FIG. 15 illustrates an example of a constitution for portable remote terminal 20 in such a case.

In this embodiment, regeneration device 161 is disposed and map data stored, for example in CD-ROM are regenerated and displayed on display section 95. Other constitutions are identical with those in FIG. 1 and duplicate explanations will be omitted.

Figure 16:
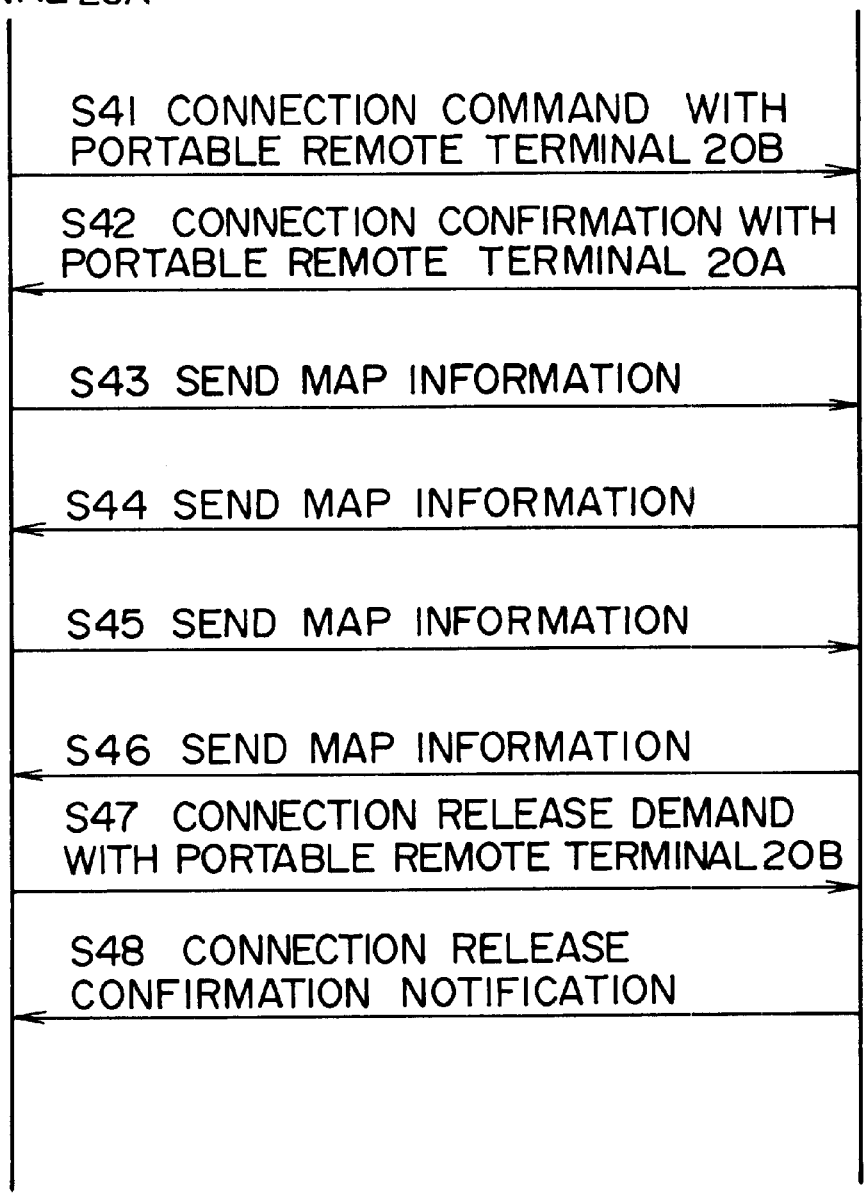
FIG. 16 is a sequence chart for explaining the operation of the portable remote terminal in FIG. 15.

Then, operation of portable remote terminal 20 constituted as shown in FIG. 15 will be explained with reference to FIG. 16. At first, at step S41, portable remote terminal 20A outputs a connection demand signal to portable remote terminal 20B. If portable remote terminal 20B answers the connection demand when receiving this by way of radio communication network 23, it outputs a connection confirmation signal at step S42 to portable remote terminal 20A. Thus, a connection link is connected between portable remote terminal 20A and portable remote terminal 20B into a state in which voice conversation is possible between each other.

When such a communication link is formed, CPU 91 of portable remote terminal 20A acquires, at step S43, the ID number of base station 21A to form the communication link as the present position. Then, it acquires positional information corresponding to the ID number from the table as shown in FIG. 6 stored in RAM 93. Further, it reads out map data corresponding to the position from CD-ROM of regeneration device 161, generates and adds the present position of portable remote terminal 20A and a mark indicating the moving direction detected by the direction compass 131 to the map data and outputs the data by way of communication circuit 98 to portable remote terminal 20B.

Portable remote terminal 20B, receives the map data by way of communication circuit 98 and displays the same on display section 95. Thus, a map in which the present position of user A and the moving direction detected by direction compass 131 are shown is displayed, for example, as shown in FIG. 13 on display section 95.

While on the other hand, CPU 91 of portable remote terminal 20B acquires, at step S44, the ID number of nearest base station (base station that forms a communication link) 21B and acquires a positional information corresponding to the ID number from the table stored in RAM 93. Then, CPU 91 reads out the map data corresponding to the positional information from CD-ROM of regeneration device 161, superpose the present position of portable remote terminal 20B and marks indicating the moving direction detected by direction compassic 131 to the map data and transmits the data from communication circuit 98 to portable remote terminal 20A.

Portable terminal 20A receives the transmitted data by communication circuit 98 and displays the same on display section 95. Thus, a map in which the present position of user B and marks indicating the moving direction are added, for example, as shown in FIG. 14 id displayed.

When portable remote terminal 20A conducts hand over processing, new map information is transmitted at step S45 to portable remote terminal 20B. In the same way, when hand over processing is conducted in portable remote terminal 20B, new map information is transmitted at step S46 from portable remote terminal 20B to portable remote terminal 20A.

When the positioning service is to be ended, portable remote terminal 20A outputs, at step S47, a connection release demand signal to portable remote terminal 20B. In response to this, portable remote terminal 20B outputs, at step S48, a connection release confirmation information to portable remote terminal 20A.

Alternately, only the present position (ID number) and the moving direction may be transmitted to each of mating terminals, while the map data may be regenerated and displayed from regeneration device 161 of its own. In this case, the present position and the moving direction of its own may be detected and displayed by the terminal itself. Thus display as shown in FIG. 12 can be obtained.

Figure 17:
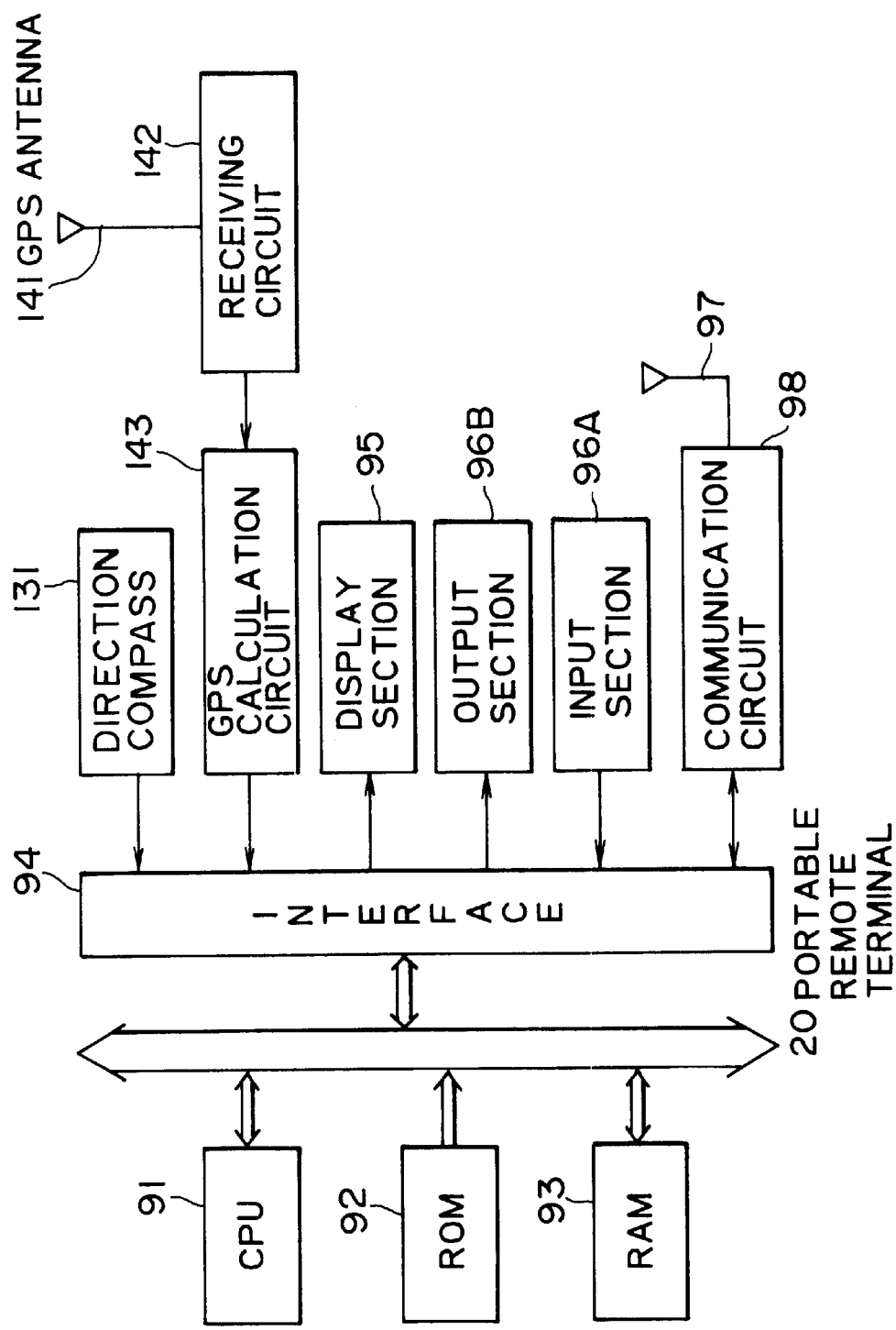
FIG. 17 is a block diagram illustrating a further example of a constitution for the portable remote terminal 20 in FIG. 1.
Figure 18:
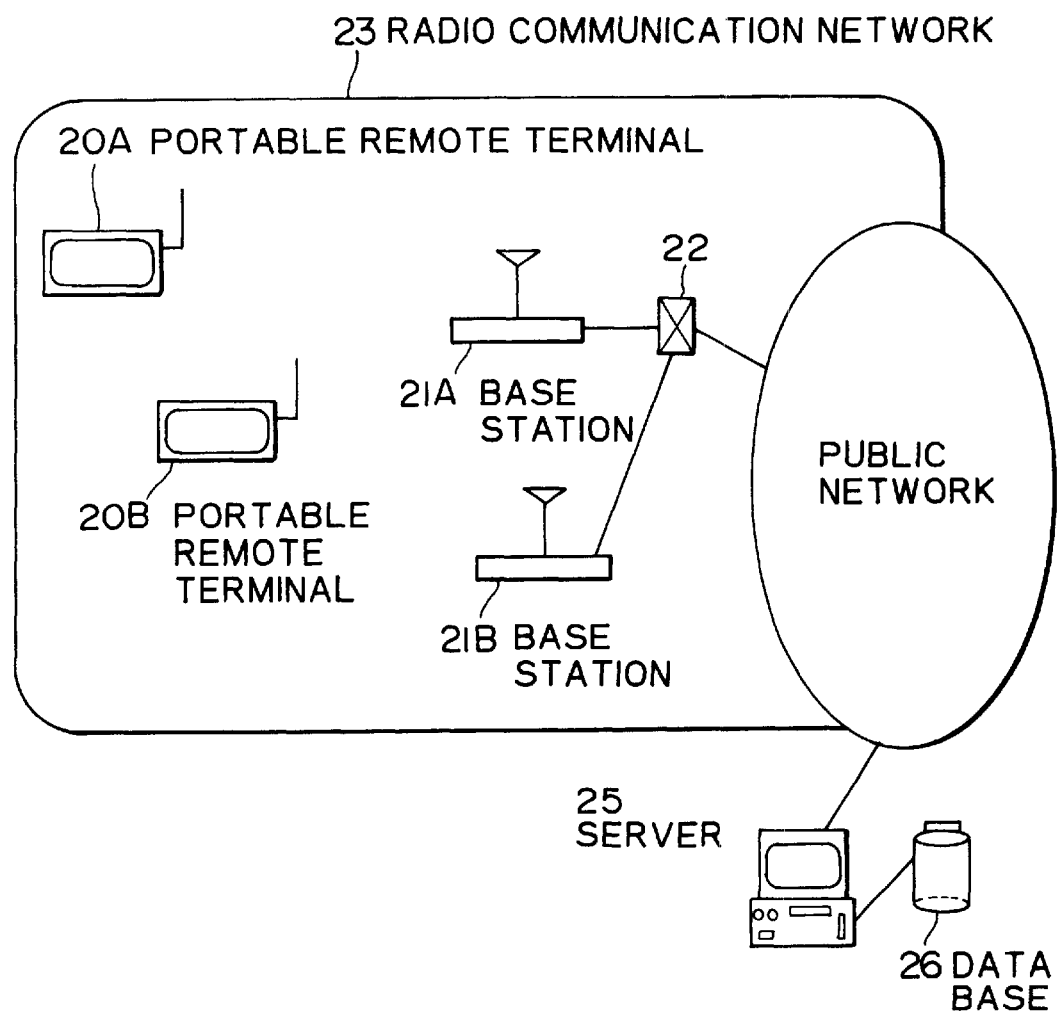
FIG. 18 is a view illustrating a constitution for communication of the portable remote terminal in FIG. 1 with a low earth orbit satellite.

In the foregoing embodiments, the present position is detected from the cover area of base station 21, but it may also be received from radiowaves of GPS. In this case, as shown in FIG. 17, receiving circuit 142 having GPS antenna 141 is disposed to portable remote terminal 20. Receiving circuit 142 receives radiowaves transmitted from satellites such as a low earth orbit satellites 10A, 10B in FIG. 18 and demodulates them. GPS calculation circuit 143 calculates the present position (latitude and longitude) based on the demodulated output.

Figure 19:
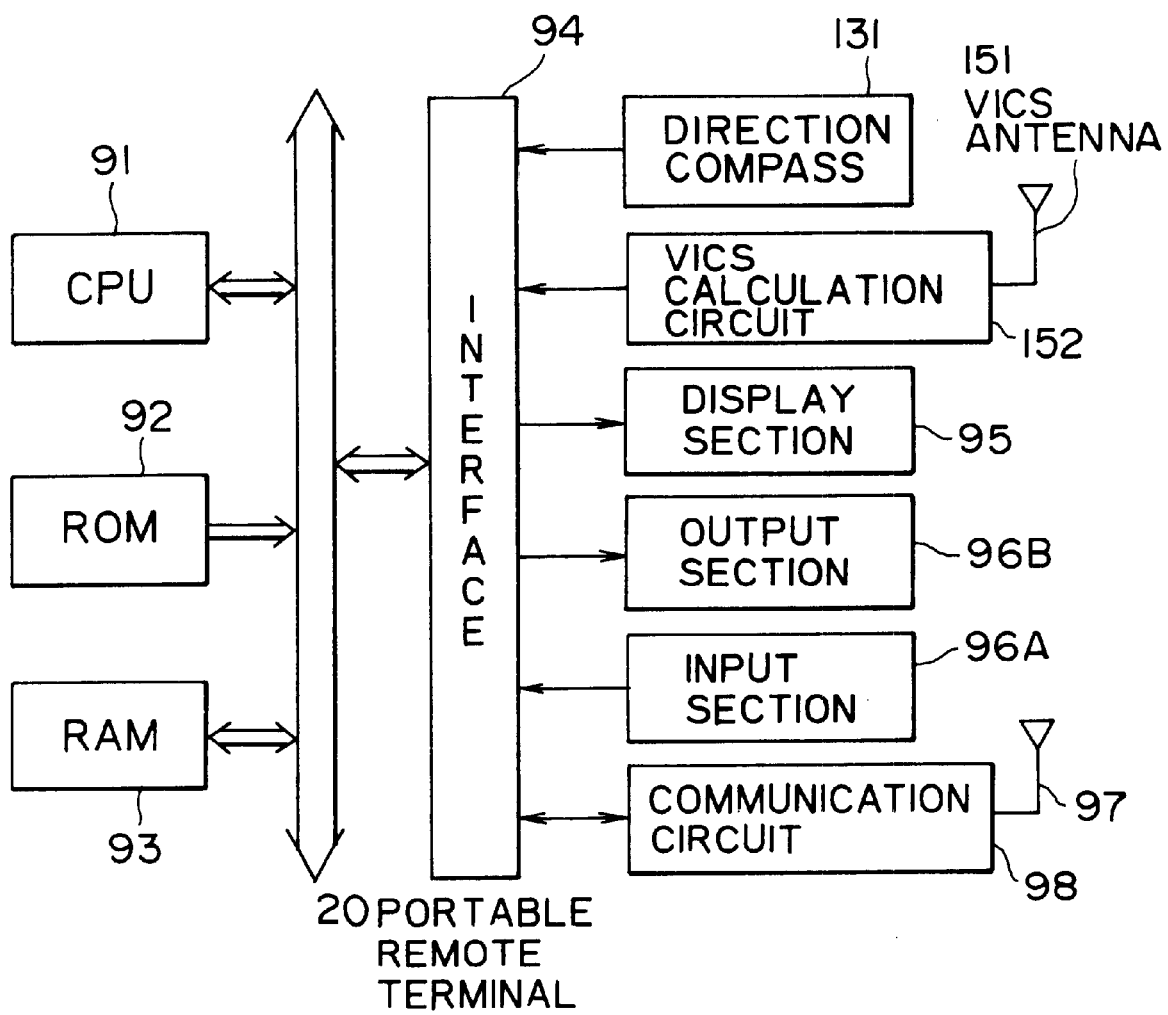
FIG. 19 is a block diagram illustrating another example of a constitution for the portable remote terminal in FIG. 1.
Figure 20:
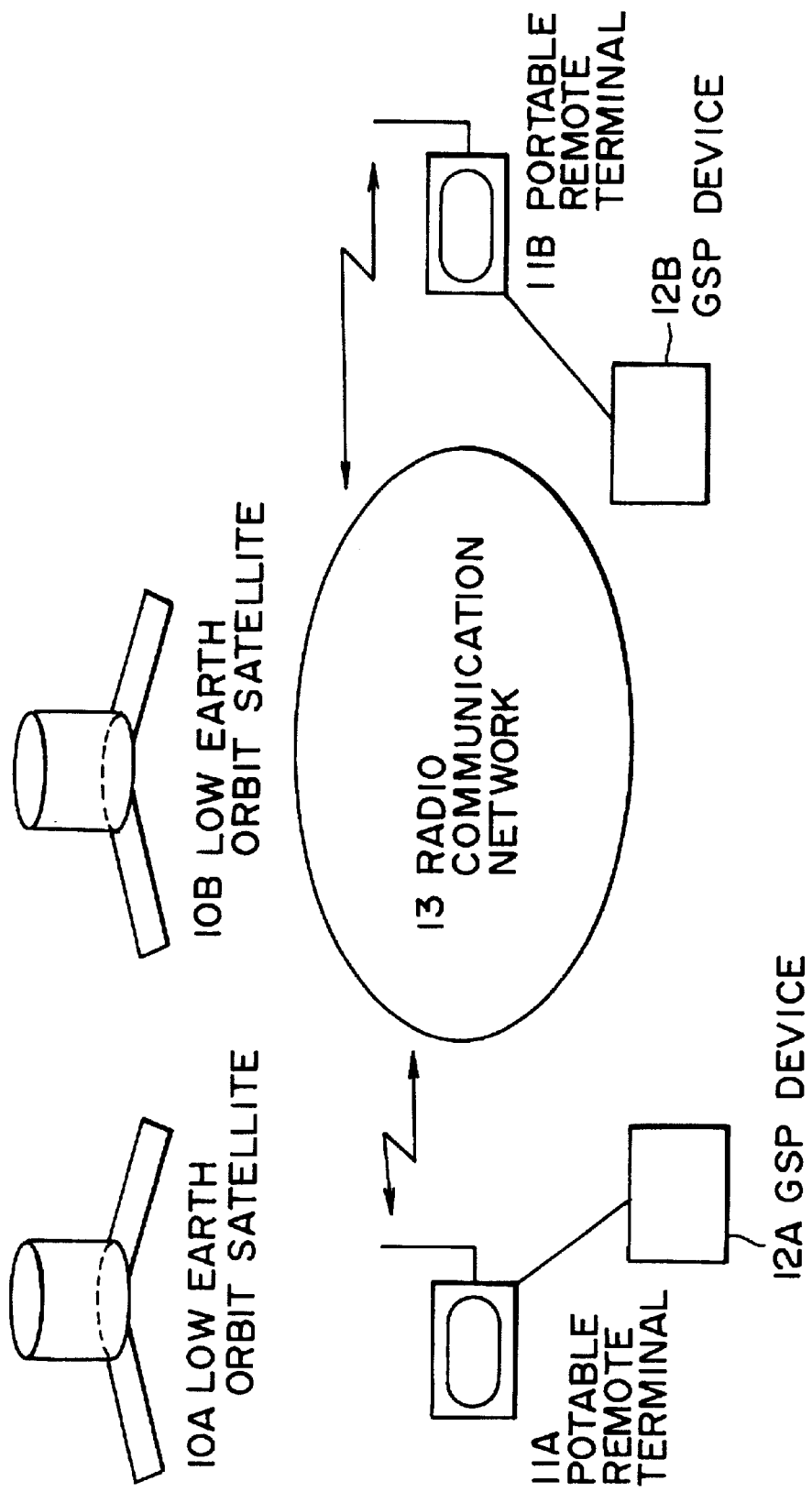
FIG. 20 is a view for explaining the constitution of a positioning system of the prior art.

FIG. 19 illustrates a further example for the constitution of portable remote terminal 20. In this embodiment, the present position is detected from radiowaves of VICS (Vehicle Information and Communication System). For this purpose, VICS calculation circuit 152 having antenna 151 is added.

VICS is a system intended for providing traffic information to vehicles, etc. by beacons disposed at predetermined positions on roads. Since the system transmits also positionally information for each of the beacons, the positional information of a beacon can be obtained by demodulating radiowaves received by way of VICS antenna 51 in VICS calculation circuit 152.

Further, the present position may also be detected from both of VICS and GPS.

In the embodiments described above, while PHS is used as a radio communication network, a digital cellular system may also be adopted.

Further, although explanation has been made to the example of applying the present invention to portable remote terminals, the invention is applicable, for example, also to terminal equipments that moves being carried on a vehicle or the likes.

As described above in the terminal equipment according to the present invention, since positional information of other terminal equipment transmitted by way of the radio communication network is received, the present position of the mating terminal can be recognized rapidly, reliably and conveniently. Further, it is possible to attain a terminal equipment small in size, convenient to carry about and of a reduced cost.

What is claimed is:

1. A method for providing map data to terminal devices, comprising the steps of:

receiving at a server having access to a database of map data, a request for a map indicating the position of a second terminal device, the request being received from a first terminal device having first positional information;

receiving at the server, second positional information for the second terminal device;

accessing the database of map data and correlating the second positional information to particular map data illustrating the position of the second terminal device; and transmitting the particular map data to the first terminal device;

whereby said second terminal device is operable to communicate over a network having a plurality of base stations, said server has stored therein data cross-referencing the positions of said base stations with respective base station identifications, said second positional information is a network base station identifier, and the position of said second terminal device is determined by comparing said base station identifier with said data; and whereby said base station identifier is associated with a first coverage area, and when said second terminal device moves out of said first coverage area into a second coverage area associated with a second base station identifier, said second positional information is automatically updated by transmitting said second base station identifier from said second terminal device to said server and replacing said base station identifier with said second base station identifier.

2. The method according to claim 1, wherein the particular map data further illustrates a direction of movement for at least one of the first terminal device and the second terminal device.

3. The method according to claim 1, wherein the step of accessing the data base of map data comprises the steps of:
analyzing the first positional information relative to the second positional information; and
selecting as the particular map data a map scaled to contain the positions of the first terminal device and the second terminal device.

4. The method according to claim 1, wherein the position of the second terminal device is in the form of data indicative of the latitude and longitude of the second terminal device.

5. A method for providing map data to portable handheld terminal devices, comprising the steps of:
receiving at a server having access to a database of map data, a request for a map indicating the position of a first portable handheld terminal device relative to a second position, the request being received from the first portable handheld terminal device;
receiving at the server, first positional information for the first portable handheld terminal device in response to the request;
accessing the database of map data and correlating the first positional information and second position to particular map data illustrating the relative positions of the first portable handheld terminal device and the second position; and
transmitting the particular map data to the first portable handheld terminal device;
whereby said first portable handheld terminal device is operable to communicate over a network having a plurality of base stations, said server has stored therein data cross-referencing the positions of said base stations with respective base station identifications, said first positional information is a network base station identifier, and the position of said first portable handheld terminal device is determined by comparing said base station identifier with said data; and
whereby said base station identifier is associated with a first coverage area, and when said first portable handheld terminal device moves out of said first coverage area into a second coverage area associated with a second base station identifier, said first positional information is automatically updated by transmitting said second base station identifier from said second terminal device to said server and replacing said base station identifier with said second base station identifier.

6. The method according to claim 5, wherein the second position corresponds to a second portable handheld terminal device.

7. The method according to claim 6, wherein the particular map data further illustrates a direction of movement,for at least one of the first portable handheld terminal device and the second portable handheld terminal device.

8. The method according to claim 5, wherein the particular map data further illustrates a direction of movement for the first portable handheld terminal device.

9. The method according to claim 5, wherein the position of the first portable handheld terminal device is in the form of data indicative of the latitude and longitude of the first portable handheld terminal device.

10. A system for providing map data to terminal devices, comprising:
means for receiving at a server having access to a database of map data, a request for a map indicating the position of a second terminal device, the request being received from a first terminal device having first positional information;
means for receiving at the server, second positional information for the second terminal device;
means for accessing the database of map data and correlating the second positional information to particular map data illustrating the position of the second terminal device; and
means for transmitting the particular map data to the first terminal device;
whereby said second terminal device is operable to communicate over a network having a plurality of base stations, said server has stored therein data cross-referencing the positions of said base stations with respective base station identifications, said second positional information is a network base station identifier, and the position of said second terminal device is determined by comparing said base station identifier with said data; and
whereby said base station identifier is associated with a first coverage area, and when said second terminal device moves out of said first coverage area into a second coverage area associated with a second base station identifier, said second positional information is automatically updated by transmitting said second base station identifier from said second terminal device to said server and replacing said base station identifier with said second base station identifier.

11. The system according to claim 10, wherein the particular map data further illustrates a direction of movement for at least one of the first terminal device and the second terminal device.

12. The system according to claim 10, wherein accessing the data base of map data includes analyzing the first positional information relative to the second positional information, and selecting as the particular map data a map scaled to contain the positions of the first terminal device and the second terminal device.

13. The system according to claim 10, wherein the position of the second terminal device is in the form of data indicative of the latitude and longitude of the second terminal device.

14. A system for providing map data to portable handheld terminal devices, comprising:
means for receiving at a server having access to a database of map data, a request for a map indicating the position of a first portable handheld terminal device relative to a second position, the request being received from the first portable handheld terminal device;
means for receiving at the server in response to the request, first positional information for the first portable handheld terminal device;
means for accessing the database of map data and correlating the first positional information and second position to particular map data illustrating the relative positions of the first portable handheld terminal device and the second position; and
means for transmitting the particular map data to the first portable handheld terminal device;
whereby said first portable handheld terminal device is operable to communicate over a network having a plurality of base stations, said server has stored therein data cross-referencing the positions of said base stations with respective base station identifications, said first positional information is a network base station identifier, and the position of said first portable handheld terminal device is determined by comparing said base station identifier with said data; and whereby said base station identifier is associated with a first coverage area, and when said first portable handheld terminal device moves out of said first coverage area into a second coverage area associated with a second base station identifier, said first positional information is automatically updated by transmitting said second base station identifier from said second terminal device to said server and replacing said base station identifier with said second base station identifier.

15. The system according to claim 14, wherein the second position corresponds to a second portable handheld terminal device.

16. The system according to claim 15, wherein the particular map data further illustrates a direction of movement, for at least one of the first portable handheld terminal device and the second portable handheld terminal device.

17. The system according to claim 14, wherein the particular map data further illustrates a direction of movement for the first portable handheld terminal device.

18. The system according to claim 14, wherein the position of the first portable handheld terminal device is in the form of data indicative of the latitude and longitude of the first portable handheld terminal device.

19. A server for providing map data to terminal devices, comprising:

means for receiving a request for a map indicating the position of a second terminal device, the request being received from a first terminal device having first positional information;

means for receiving second positional information for the second terminal device;

means for accessing :a database of map data and correlating the second positional information to particular map data illustrating the position of the second terminal device; and means for transmitting the particular map data to the first terminal device;

whereby said second terminal device is operable to communicate over a network having a plurality of base stations, said server has stored therein data cross-referencing the positions of said base stations with respective base station identifications, said second positional information is a network base station identifier, and the position of said second terminal device is determined by comparing said base station identifier with said data; and whereby said base station identifier is associated with a first coverage area, and when said second terminal device moves out of said first coverage area into a second coverage area associated with a second base station identifier, said second positional information is automatically updated by transmitting said second base station identifier from said second terminal device to said server and replacing said base station identifier with said second base station identifier.

20. A server for providing map data to portable handheld terminal devices, comprising:

means for receiving a request for a map indicating the position of a first portable handheld terminal device relative to a second position, the request being received from the first portable handheld terminal device;

means for receiving in response to the request, first positional information for the first portable handheld terminal device;

means for accessing a database of map data and correlating the first positional information and second position to particular map data illustrating the relative positions of the first portable handheld terminal device and the second position; and means for transmitting the particular map data to the first portable handheld terminal device;

whereby said first portable handheld terminal device is operable to communicate over a network having a plurality of base stations, said server has stored therein data cross-referencing the positions of said base stations with respective base station identifications, said first positional information is a network base station identifier, and the position of said first portable handheld terminal device is determined by comparing said base station identifier with said data; and whereby said base station identifier is associated with a first coverage area, and when said second terminal device moves out of said first coverage area into a second coverage area associated with a second base station identifier, said second positional information is automatically updated by transmitting said second base station identifier from said second terminal device to said server and replacing said base station identifier with said second base station identifier.

21. A system for providing map data to terminal devices, comprising:

a server for receiving a request for a map indicating the position of a second terminal device, the request being received from a first terminal device having first positional information, and for receiving second positional information for the second terminal device; and a database of map data;

wherein the server accesses the database of map data and correlates the second positional information to particular map data illustrating the position of the second terminal device, and transmits the particular map data to the first terminal device;

whereby said second terminal device is operable to communicate over a network having a plurality of base stations, said server has stored therein data cross-referencing the positions of said base stations with respective base station identifications, said second positional information is a network base station identifier, and the position of said second terminal device is determined by comparing said base station identifier with said data; and whereby said base station identifier is associated with a first coverage area, and when said second terminal device moves out of said first coverage area into a second coverage area associated with a second base station identifier, said second positional information is automatically updated by transmitting said second base station identifier from said second terminal device to said server and replacing said base station identifier with said second base station identifier.

22. A system for providing map data to portable handheld terminal devices, comprising:

a server for receiving a request for a map indicating the position of a first portable handheld terminal device relative to a second position, the request being received from the first portable handheld terminal device, and for receiving in response to the request first positional information for the first handheld terminal device; and a database of map data;

wherein the server accesses the database of map data and correlates the first positional information and second position to particular map data illustrating the relative positions of the first portable handheld terminal device and the second position, and transmits the particular map data to the first portable handheld terminal device;

whereby said first portable handheld terminal device is operable to communicate over a network having a plurality of base stations, said server has stored therein data cross-referencing the positions of said base stations with respective base station identifications, said first positional information is a network base station identifier, and the position of said first portable handheld terminal device is determined by comparing said base station identifier with said data; and whereby said base station identifier is associated with a first coverage area, and when said first portable handheld terminal device moves out of said first coverage area into a second coverage area associated with a second base station identifier, said first positional information is automatically updated by transmitting said second base station identifier from said second terminal device to said server and replacing said base station identifier with said second base station identifier.

23. A server for providing map data to terminal devices, comprising:

a receive path for receiving a request for a map indicating the position of a second terminal device, the request being received from a first terminal device having first positional information, and for receiving second positional information for the second terminal device; and a database of map data;

wherein the server correlates the second positional information to particular map data illustrating the position of the second terminal device, and transmits the particular map data to the first terminal device;

whereby said second terminal device is operable to communicate over a network having a plurality of base stations, said server has stored therein data cross-referencing the positions of said base stations with respective base station identifications, said second positional information is a network base station identifier, and the position of said second terminal device is determined by comparing said base station identifier with said data; and whereby said base station identifier is associated with a first coverage area, and when said second terminal device moves out of said first coverage area into a second coverage area associated with a second base station identifier, said second positional information is automatically updated by transmitting said second base station identifier from said second terminal device to said server and replacing said base station identifier with said second base station identifier.

24. A server for providing map data to portable handheld terminal devices, comprising:

a receive path for receiving a request for a map indicating the position of a first portable handheld terminal device relative to a second position, the request being received from the first portable handheld terminal device, and for receiving in response to the request first positional information for the first handheld terminal device; and a database of map data;

wherein the server correlates the first positional information and second position to particular map data illustrating the relative positions of the first portable handheld terminal device and the second position, and transmits the particular map data to the first portable handheld terminal device;

whereby said first portable handheld terminal device is operable to communicate over a network having a plurality of base stations, said server has stored therein data cross-referencing the positions of said base stations with respective base station identifications, said first positional information is a network base station identifier, and the position of said first portable handheld terminal device is determined by comparing said base station identifier with said data; and whereby said base station identifier is associated with a first coverage area, and when said first portable handheld terminal device moves out of said first coverage area into a second coverage area associated with a second base station identifier, said first positional information is automatically updated by transmitting said second base station identifier from said second terminal device to said server and replacing said base station identifier with said second base station identifier.

* * * * *